United States Patent [19]
Persson

[11] Patent Number: 5,470,013
[45] Date of Patent: Nov. 28, 1995

[54] METHOD OF CLADDING TUBES

[75] Inventor: Ingemar Persson, Gyttorp, Sweden

[73] Assignee: Exploweld AB, Storfors, Sweden

[21] Appl. No.: 290,839

[22] PCT Filed: Feb. 19, 1993

[86] PCT No.: PCT/SE93/00136

§ 371 Date: Aug. 19, 1994

§ 102(e) Date: Aug. 19, 1994

[87] PCT Pub. No.: WO93/16836

PCT Pub. Date: Sep. 2, 1993

[30] Foreign Application Priority Data

| Feb. 21, 1992 | [SE] | Sweden | 9200534 |
| Apr. 8, 1992 | [SE] | Sweden | 9201121 |
| Jan. 20, 1993 | [SE] | Sweden | 9300154 |

[51] Int. Cl.⁶ ............................................... B23K 20/08
[52] U.S. Cl. .............................................. 228/108; 228/2.5
[58] Field of Search .................................. 228/107, 108, 228/109, 2.5; 29/421.2

[56] References Cited

U.S. PATENT DOCUMENTS

| 3,036,374 | 5/1962 | Williams | 228/108 |
| 3,316,627 | 5/1967 | Suzuki et al. | 228/107 |
| 3,364,561 | 1/1968 | Barrington | 228/108 |
| 3,740,826 | 6/1973 | Baba | 29/470.1 |
| 3,863,327 | 2/1975 | Legate et al. | 29/470.1 |
| 4,494,392 | 1/1985 | Schroeder | 72/56 |
| 5,104,027 | 4/1992 | Persson | 228/107 |

FOREIGN PATENT DOCUMENTS

| 41-12336 | 7/1966 | Japan | 228/107 |
| 43-26737 | 11/1968 | Japan | 228/107 |
| 48-20976 | 6/1973 | Japan | 228/107 |

*Primary Examiner*—Samuel M. Heinrich
*Attorney, Agent, or Firm*—Nies, Kurz, Bergert & Tamburro

[57] ABSTRACT

A method of cladding an outer tube (1) with an inner tube (2), wherein the inner tube is made of a corrosion-resistant material, for instance. The inventive is characterized by placing a number of explosive charges (3) in mutually spaced arrangement in the inner tube (2), in contact with or essentially in contact with the inner surface of the inner tube; filling the inner tube with a pressure-transmitting medium (4), preferably water; and detonating all explosive charges (3) simultaneously, so as to obtain a local metallurgical bond (6) at the regions of the explosive charges and so as to cause the inner tube (2) to expand into abutment with the outer tube (1).

22 Claims, 2 Drawing Sheets

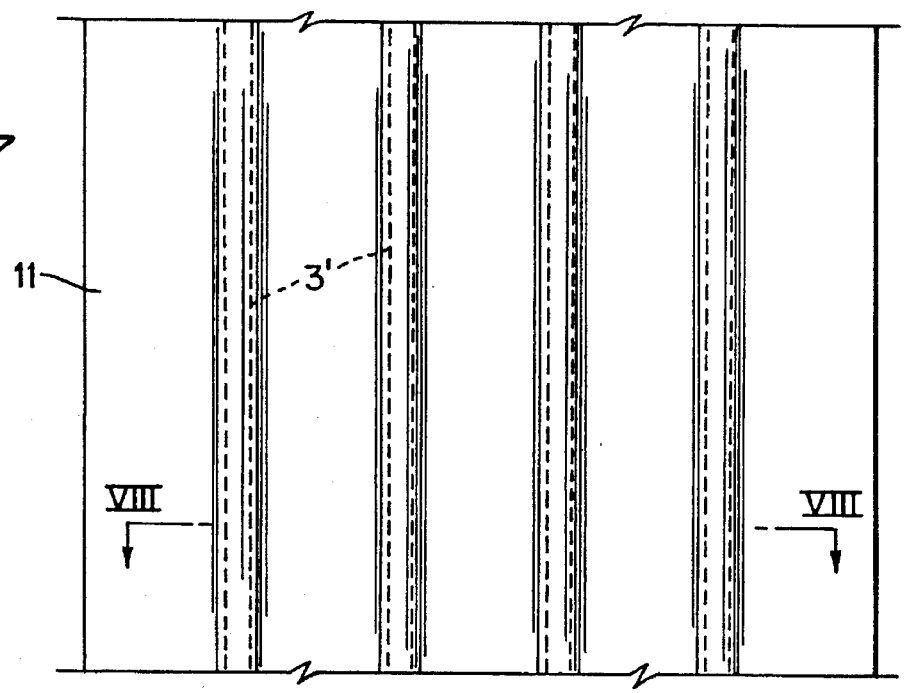
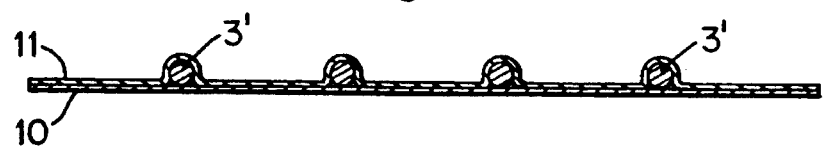
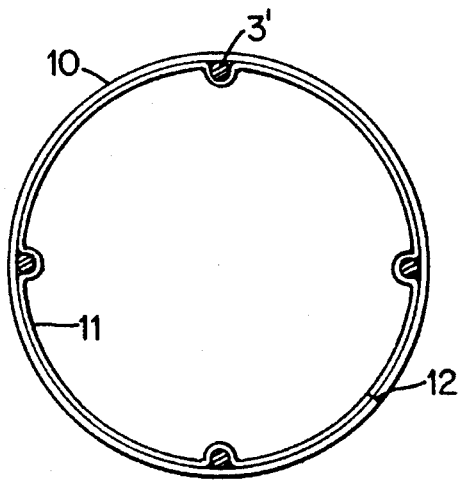
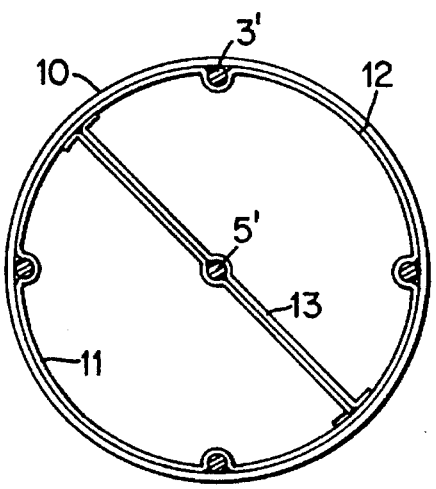

5,470,013

METHOD OF CLADDING TUBES

BACKGROUND OF THE INVENTION

1. Field of the Invention

The present invention relates to a method of cladding an outer tube with an inner tube by detonating explosive charges.

2. Description of the Prior Art

It is known to expand a corrosion-resistant inner tube into contact with an outer, mechanically strong tube by means of an explosion process, so as to obtain a mechanical pressure joint between the two tubes. It is also known to bind the two tubes metallurgically over the whole of their contacting surfaces by means of an explosion-welding process.

In the case of the mechanical pressure joint, one drawback is that in the case of large diameters and thin cladding tubes, there is a risk that the latter tube will become inwardly distorted should a vacuum be generated in the conduit.

In the case of the metallurgical joint, the risk of inwardly distorsion does not exist, since a joint of this nature has a high mechanical strength, even against radially and inwardly acting stresses.

An explosion-welding process, however, is expensive, particularly in the case of large diameters, which require very large quantities of explosives and supportive fixtures. In practice, explosion-welding processes are restricted to tube lengths of 4–5 metres.

These drawbacks are avoided with the inventive method, both with solely mechanical joints and also with explosion welds effected over the entire surface of the tubes.

SUMMARY OF THE INVENTION

Thus, the present invention relates to a method of cladding an outer tube with an inner tube in which the inner tube is made, for instance, of a corrosion-resistant material. The inventive method is characterized by placing a number of explosive charges in the inner tube in contact with or essentially in contact with the inner surface of the tube, said explosive charges being spaced from one another and distributed over the inner surface of said inner tube; filling the inner tube with a pressure-transmitting medium, preferably water; and detonating all explosive charges simultaneously, such as to cause a local metallurgical joint in the vicinity of respective explosive charges and expansion of the inner tube into abutment with the outer tube.

BRIEF DESCRIPTION OF THE DRAWING

The invention will now be described in more detail with reference to an exemplifying embodiment thereof and also with reference to the accompanying drawings, in which

FIGS. 7 and 8 are respectively a top view and a sectional view of a device for mounting explosive charges in a tube, said device being intended for use when practicing the inventive method;

FIG. 9 is a cross-section view to illustrate the device of FIGS. 7 and 8 rolled into an assembled cylindrical state; and FIG. 10 illustrates a variant of the device illustrated in FIG. 9.

DESCRIPTION OF THE PREFERRED EMBODIMENTS

Figure 1:
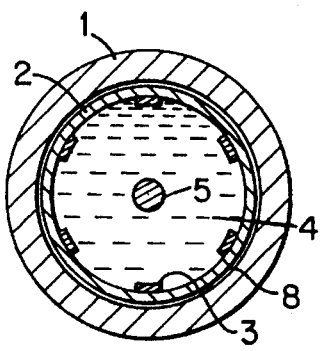
FIGS. 1 and 2 are respectively radial and axial section views of an outer and an inner tube with explosive charges placed in accordance with one embodiment of the inventive method.
Figure 2:
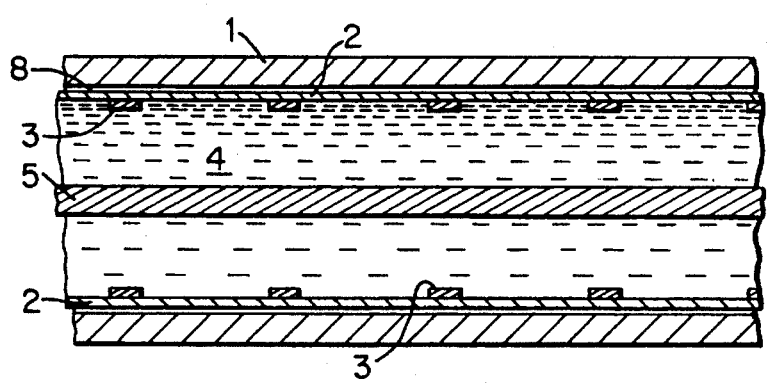

FIGS. 1 and 2 illustrate an outer tube 1 which is to be clad with an inner tube 2, in accordance with one embodiment of the invention. The inner tube 2 may consist of a corrosion-resistant material for instance, whereas the outer tube 1 may be a standard steel tube.

According to the invention, a number of small explosive charges 3 are placed in the inner tube at the inner surface of the tube 2. These charges 3 are arranged in mutually spaced relationship on the inner surface of the inner tube 2 and are distributed over said inner surface in contact with or essentially in contact with said inner surface. The inner tube 2 is then filled with a pressure-transmitting medium 4, preferably water. All explosive charges 3 are detonated simultaneously, in a single volley.

Figure 3:
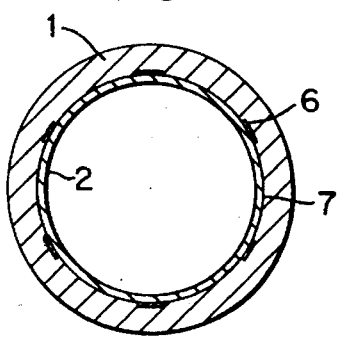
FIGS. 3 and 4 are views corresponding to FIGS. 1 and 2 and show the outer and the inner tube subsequent to having detonated the explosive charges.
Figure 4:
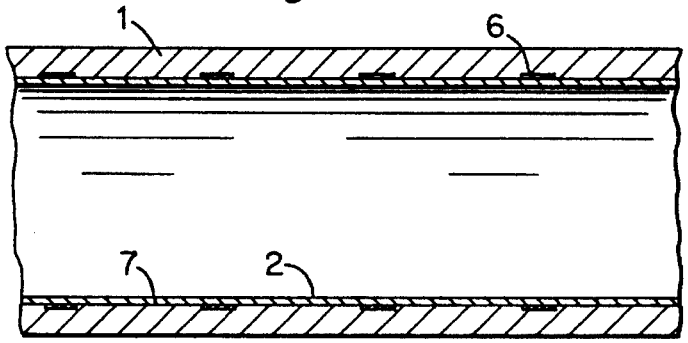

FIGS. 3 and 4 illustrate the outer tube 1 and the inner tube 2 upon completion of the aforedescribed procedure. Detonation of the explosive charges 3 results in the local formation of a metallurgical joint or bond between the inner and the outer tube in the vicinity of respective explosive charges. These joints or bonds are referenced 6 in FIGS. 3 and 4. The detonation results in shockwaves which propagate in the pressure-transmitting medium 4. The shockwaves interfere with one another and generate a high pressure within the inner tube 2, which therewith expands outwardly into contact with the outer tube 1. There is thus formed a mechanical joint which corresponds to a pressure joint between the inner and the outer tube over those regions where no metallurgical bond is formed. Those regions in which surfaces are mutually joined mechanically are referenced 7 in FIGS. 3 and 4.

The metallurgical bonding surfaces 6 prevent the inner tube 2 from being compressed by subpressures generated in the tube and assist in creating an homogenous unit in which the outer tube and inner tube will move in unison when influenced by temperature variations, pressure variations, etc.

Figure 5:
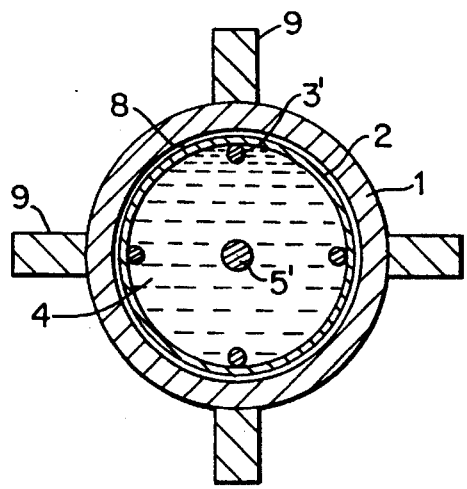
FIGS. 5 and 6 are views similar to those of FIG. 1 and illustrate other embodiments of the inventive method.

FIG. 5 is a view similar to the view of FIG. 1 and illustrates another embodiment of the invention. Those components which are identical with components of the FIG. 1 embodiment have been identified by the same reference signs, and components which are functionally similar have been identified by the same reference signs with the addition of a prime.

Shown in FIG. 5 is an outer tube 1, an inner tube 2, and a pressure-transmitting medium 4.

In the case of this embodiment, a number of explosive strings 3' are placed on the inner surface of the inner tube 2. The explosive strings 3' are spaced apart and extend from one end of the inner tube 2 to the other end thereof. Before detonating the explosive strings 3', the inner tube 2 is filled with a pressure-transmitting medium 4, preferably water. All explosive charges 3' are then detonated. Detonation of the explosive charges is initiated from one end of the tube, such as to explode all charges to the other end of the tube simultaneously.

This detonation of the explosive charges results in the formation of metallurgical bonds and mechanical joints, in the same manner as that described above with reference to FIGS. 1–4. In this case, however, the metallurgical bonds extend axially between the tubes 1 and 2, and not in a punctiform fashion as in the earlier described embodiment.

According to one preferred variant of the described embodiments of the inventive method, further explosive charges 5, (FIGS. 1 and 2) and 5', (FIG. 5) are located in the medium 4 in the inner tube 2, at a radial distance from the inner surface of the tube 2, these further charges being detonated simultaneously with the charges 3 or 3', so as to amplify the pressure wave generated in the medium 4 in conjunction with detonation. In the case of the preferred embodiment variants illustrated in the drawings, the explosive charges 5 and 5' are comprised of explosive strings located in the centre of the tube and extending throughout the whole length of the tube. Naturally, the string of explosive may be located in a position different to that shown and several strings of explosive located in spaced relationship with the tube wall may be used. The explosive charges 5 and 5' may also have the form of one or more discontinuous strings. All explosive charges 3, 3' and 5, 5' are connected together with the aid of either a detonating fuse, a nonel fuse, or an electric ignition system, so that the explosive charges can be detonated simultaneously, in a single volley.

Figure 6:
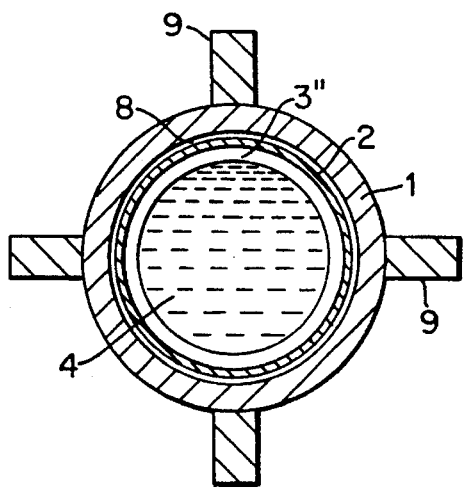

FIG. 6 illustrates a further embodiment of the inventive arrangement illustrated in FIG. 1, where mutually identical components have been identified by the same reference signs as those used in FIG. 1, while functionally corresponding components have been identified with the same reference signs to which a double prime has been added. In the case of this embodiment, the explosive charges 3" placed in contact with the inner wall of the inner tube 2 have the form of explosive annuli which are mutually separated axially along the length of the tube.

In the case of the FIG. 5 embodiment, the explosive strings 3 are straight and extend axially along the inner tube. It will be understood that the number of explosive strings may be varied.

The explosive strings need not be placed in a straight line. According to one further embodiment, (not illustrated) the explosive strings are extended helically in the inner tube 2, along the main axis thereof.

The explosive strings will preferably have a circular cross-section, so as to achieve the best effect, although they may have other cross-sectional shapes, for instance a rectangular cross-sectional shape.

It will thus be obvious that the explosive strings can be disposed in many different ways, the essential criterion being that local metallurgical contact is achieved at a number of locations sufficient to prevent the inner tube being deformed inwardly in the event of subpressure conditions in the tube.

In the case of the aforedescribed embodiments, the outer diameter of the inner tube 2 prior to detonation is smaller than the inner diameter of the outer tube, so as to form a gap 8 between the tubes. An advantage is afforded when the air present in the gap 8 is evacuated therefrom prior to detonating the explosive charges, preferably to a pressure below about 1 millibar.

The outer tube may also be supported by external supporting means. FIGS. 5 and 6 illustrate the provision of steel outer counterpressure means 9. However, it is not necessary to support the outer tube in the large majority of cases. In those instances when the outer tube has a small wall thickness, this support is obtained satisfactorily with a simple steel band which extends axially level with the rows 3 or the annuli 3" of explosive charges in contact with the inner surface of the inner tube in the illustrated exemplifying embodiments. The positioning of the explosive charges 3, 3', 3" illustrated in the drawings in thus particularly suitable in the case of thin-wall outer tubes.

According to one preferred embodiment, all explosive charges are located within a hose-like device made of plastic, paper or rubber material and fitting inside the inner tube, so that the explosive charges will be well positioned. In this regard, for instance, the explosive charges may be glued firmly to the inner surface of the plastic, paper or rubber hose.

According to another preferred embodiment, the aforesaid pressure-transmitting medium 4 is also contained by the aforesaid plastic, paper or rubber hose. In this case, the hose is provided with impervious end-walls and also conveniently with a pressure-transmitting medium filling nipple.

The inventive method is intended for cladding tubes which normally have a length of up to 12 m. In tubes of this length, it is difficult and time-consuming, many times impossible, to fix the explosive charges at intended locations in contact with or essentially in contact with the inner wall of the inner tube. This problem is solved by the present invention in a manner which will be described below, step-by-step, with reference to FIGS. 7–10 and also with reference to the explosive strings 3' illustrated in FIG. 5.

These strings 3' are placed in a determined pattern on a sheet 10 of flexible, pliable material such as a plastic, rubber or paper material, and are secured to the sheet in some suitable manner. In the embodiment illustrated in FIGS. 7 and 8, the explosive strings 3' are secured to the sheet 10 by placing a similar sheet 11 on top of the sheet 10, so as to sandwich the explosive strings 3' between said sheets, whereafter the explosive strings are fastened to the sheet 10, for instance by welding or gluing. The thus formed sheet composite is then rolled into a hose, or cylindrical form, as illustrated schematically in FIG. 9 by the joint 12. When forming and joining the hose, one end of the hose is closed-off while a filling opening is formed in the other end thereof.

The thus formed hose containing the explosive strings 3' is then introduced into the inner tube and filled with pressure-transmitting medium, preferably water, the sheets from which the hose is comprised being water impermeable. The hose introduced into the tube is then filled with water at a pressure at which all folds or the like that may have occurred in conjunction with inserting the hose, or for some other reason, will be smoothed-out, so that the hose wall, and therewith the explosive charges 3', are pressed against the tube wall. The hose material may advantageously be elastic and dimensioned so that it will expand slightly before coming into contact with the inner wall of the inner tube, thereby facilitating insertion of the hose into the tube and ensuring positive abutment of the hose with the tube. When centrally located charges 5' are to be used in carrying out the inventive method, these charges are secured to the sheet 11 by means of bands 13, preferably before forming the sheets 10, 11 into a hose-like shape.

The explosive charges can be calculated in a conventional manner, and different types of explosives can be used.

Since bonding between the tubes occurs perpendicularly to the longitudinal extension of the explosive charges, as a result of the shockwave generated by detonation of the charges and transmitted to the wall of the inner tube by the liquid, it is possible to use explosive substances whose rates of detonation exceed the speed of sound in the tube material. Such explosives, for instance PETN, HMX, RDX, etc., have a reliable function, even in the case of small charges.

The inventive method thus results in a number of metallurgically bonded surfaces of limited extension. The size and configuration of the metallurgically bonded surfaces can be varied by adapting the energy content and configuration of the explosive charges in contact with the inner surface of the inner tube. Preferably in the case of the exemplifying embodiment illustrated in FIGS. 1–4, these "punctiform" charges are so dimensioned as to obtain bonding surfaces of 1–8 cm$^2$ in size, with round or oval shapes. The number of explosive charges used and the pattern in which these charges are placed on the inner surface of the inner tube in order to achieve the desired homogenous behaviour of tubes that are clad in accordance with the present invention will depend on the tube diameter and tube length. In the case of the embodiment illustrated in FIGS. 1–4, explosive charges 3 are placed axially along the tube 2 in uniformly distributed and uniformly spaced rows radially around the inner periphery of said tube. However, the explosive charges may advantageously be disposed so that mutually adjacent charges are separated from one another both axially and radially, and also other charge distribution patterns are, of course, possible within the scope of the invention. The aforedescribed method requires far less explosive substance than when the whole of the inner tube shall be explosion-welded to the outer tube, so as to obtain a metallurgical bond over the whole of the mutually contacting tube surfaces. The amount of explosive substance required when practicing the present invention is only 1/1000th to 1/500th of the amount required to achieve a fully covering explosion-welded bond.

Theoretically, the inventive method has no limitation with regard to tube length. Tubes having lengths of from 6 to 12 metres are most common, however. No practical problems are experienced with tubes of these lengths.

It will be evident from the aforegoing that the present invention overcomes the drawbacks of the known technique, mentioned in the introduction.

It is also evident that the inventive method can be varied and adapted to the material and dimensions of the tubes concerned.

The present invention shall not therefore be considered restricted to the aforedescribed and illustrated exemplifying embodiments thereof, since variations can be made within the scope of the following claims.

We claim:

1. A method of cladding a metal outer tube (1) with a metal inner tube (2), comprising: placing a number of explosive charges (3) in a mutually spaced-apart arrangement within the inner tube (2), essentially in contact with and adjacent the inner surface of said inner tube; filling the inner tube with a pressure-transmitting medium (4); and detonating all explosive charges (3) simultaneously, so as to obtain a local metallurgical bond (6) at the regions of said explosive charges and so as to cause the inner tube (2) to expand into abutment with the outer tube (1).

2. A method according to claim 1, characterized in that the explosive charges (3) are placed against the inner surface of the inner tube (2) and have a circular or oval form.

3. A method according to claim 2, characterized by dimensioning the explosive charges (3) placed against the inner surface of the inner tube (2) in a manner such that subsequent to detonation, said charges will result in metallurgical bonds (6) having a size of 1–8 cm$^2$.

4. A method according to claim 1, characterized by placing strings of explosive charges (3') against the inner surface of the inner tube (2).

5. A method according to claim 4, characterized by placing the strings (3') in straight lines which extend axially in the inner tube (2).

6. A method according to claim 4, characterized by extending the strings (3') axially but helically within the inner tube (2).

7. A method according to claim 4, characterized by arranging the strings in the form of rings (3"), and disposing a number of rings (3") in mutually spaced and mutually parallel relationship within the inner tube (2) along the length of said tube.

8. A method according to claim 1, for comprising: locating at least one further explosive charge (5, 5') in the pressure-transmitting medium (4) present in the inner tube (2), at a location spaced away from the wall of said inner tube, and detonating said at least one further explosive charge (5, 5') simultaneously with the explosive charges (3, 3') placed against the inner surface of the inner tube (2), so as to amplify the pressure wave which is effective in expanding the inner tube (2) into engagement with the outer tube (1) upon detonation of the explosive charges.

9. A method according to claim 8, characterized by giving those explosive charges (5, 5') which are located within the inner tube (2) spaced from the wall of said tube the form of explosive strings which extend along the whole length of the tube.

10. A method according to any one of claim 4, characterized by extending the explosive strings (3, 3', 3"; 5, 5') continuously in the tube.

11. A method according to any claim 4, characterized by extending the explosive strings discontinuously in said tube.

12. A method according to claim 1, wherein, prior to detonation, the outer diameter of the inner tube (2) is made smaller than the inner diameter of the outer tube (1), so as to define a gap (8) between the tubes; and including the step of evacuating the air present in he gap prior to detonating the explosive charges (3, 3', 3"; 5, 5').

13. A method according to of claims 1, characterized by placing all explosive charges (3, 3', 3"; 5, 5') within a plastic, paper or rubber hose which fits within the inner tube (2), so as to obtain effective positioning of the explosive charges.

14. A method according to claim 13, characterized by introducing said pressure-transmitting medium (4) into said plastic, paper or rubber hose.

15. A method according to claim 13, further comprising: fastening the explosive charges (3') which are to be placed adjacent the inner surface of the inner tube (2) onto a sheet of elastic material; shaping and joining the sheet in a tubular hose form which includes a filling opening at one end thereof; placing the hose form within the inner tube; and filling the hose form with pressure-transmitting medium at a pressure sufficient to press the hose form, and therewith the explosive charges (3') fastened thereto, radially outwards into abutment with the inner wall surface of the inner tube (2).

16. A method according to claim 15, characterized by fastening those explosive charges which are intended to lie spaced from the inner wall surface of the inner tube (2) to the hose wall by means of bands of elastic material.

17. The method of cladding an outer tube with an inner tube as defined in claim 1, including the step of making the inner tube of corrosion-resistant material.

18. The method of cladding an outer tube with an inner tube as defined in claim 1, wherein the step of filling the inner tube with a pressure-transmitting medium consists of filling the inner tube with water.

19. A method according to claim 8, further including placing the said at least one Further explosive charge in the center of said inner tube.

20. A method according to claim 12, wherein the air present in the said gap is evacuated therefrom to a pressure below about 1 millibar.

21. A method as defined in claim 15, further including providing a sheet of plastic material as said sheet of elastic material.

22. A method as defined in claim 15, further including providing a sheet of rubber material as said sheet of elastic material.

\* \* \* \* \*

UNITED STATES PATENT AND TRADEMARK OFFICE
CERTIFICATE OF CORRECTION

PATENT NO. : 5,470,013
DATED : November 28, 1995
INVENTOR(S) : INGEMAR PERSSON

It is certified that error appears in the above-indentified patent and that said Letters Patent is hereby corrected as shown below:

At column 6, line 12 (Claim 8, line 1), delete "for" and insert therefor --further--.
At column 6, line 27 (Claim 10, line 1), delete "any one of".
At column 6, line 30 (Claim 11, line 1), delete "any".
At column 6, line 36 (Claim 12, line 5), delete "he" and insert therefor --the--.
At column 6, line 38 (Claim 13, line 1), delete "of claims" and insert therefor --claim--.
At column 7, line 1 (Claim 19, line 2), delete "Further" and insert therefor --further--.

Signed and Sealed this

Twenty-seventh Day of February, 1996

Attest:

BRUCE LEHMAN

*Attesting Officer*     *Commissioner of Patents and Trademarks*